United States Patent [19]

Martens

[11] Patent Number: 4,888,031

[45] Date of Patent: Dec. 19, 1989

[54] PROCESS FOR PARTIAL OXIDATION OF A LIQUID OR SOLID AND/OR A GASEOUS HYDROCARBON-CONTAINING FUEL

[75] Inventor: Franciscus J. A. Martens, Amsterdam, Netherlands

[73] Assignee: Shell Oil Company, Houston, Tex.

[21] Appl. No.: 344,587

[22] Filed: Apr. 28, 1989

[30] Foreign Application Priority Data

May 26, 1988 [GB] United Kingdom ............... 8812472
Sep. 30, 1988 [GB] United Kingdom ............... 8822946

[51] Int. Cl.$^4$ ............................................... C10J 3/46
[52] U.S. Cl. ................................. 48/197 R; 48/206; 48/215; 252/373
[58] Field of Search .................. 48/197 R, 202, 203, 48/206, 210, 212, 215, 196 R, 86 R, 200, 201; 252/373; 110/247

[56] References Cited

U.S. PATENT DOCUMENTS

| | | | |
|---|---|---|---|
| 4,351,647 | 9/1982 | Marion | 48/197 R |
| 4,443,230 | 4/1984 | Stellanio | 252/373 |
| 4,491,456 | 1/1985 | Schlinger | 48/197 R |
| 4,502,633 | 3/1985 | Saxon | 48/197 R |
| 4,789,384 | 12/1988 | Martens et al. | 48/197 R |

FOREIGN PATENT DOCUMENTS 0098043 11/1984 European Pat. Off.
180304 6/1973 Netherlands.
2164951 4/1986 United Kingdom.

*Primary Examiner*—Peter Kratz
*Attorney, Agent, or Firm*—Ronald R. Reper

[57] ABSTRACT

Process for the partial oxidation of a liquid or solid and/or a gaseous fuel using a multi-orifice burner comprising a central channel and four concentric channels encircling the central channel. Liquid or solid fuel is supplied through the second concentric channel and the oxidizer is supplied through the first concentric channel and the third concentric channel. Hydrocarbon gas and/or moderator is supplied through the central channel and the fourth concentric channel. The mass ratio of liquid or solid fuel to hydrocarbon gas ranges from 0 to 1.

5 Claims, No Drawings

PROCESS FOR PARTIAL OXIDATION OF A LIQUID OR SOLID AND/OR A GASEOUS HYDROCARBON-CONTAINING FUEL

BACKGROUND OF THE INVENTION

The invention relates to a process for partial oxidation of a liquid or solid and/or a gaseous hydrocarbon-containing fuel using a multi-orifice burner.

In particular, the invention relates to a process for partial oxidation of a liquid or solid and/or a gaseous hydrocarbon-containing fuel wherein an oxygen-containing gas, a liquid or solid hydrocarbon-containing fuel and/or a hydrocarbon gas are supplied to a gasification zone through a multi-orifice burner comprising a concentric arrangement of 4 annular passages or channels and 1 central passage or channel, and wherein autothermically a gaseous stream containing synthesis gas is produced under appropriate conditions.

The oxygen-containing gas is usually air or pure oxygen or a mixture thereof. In order to control the temperature in the gasification zone a moderator gas (for example steam or carbon dioxide) can be supplied to said zone.

Synthesis gas is a gas comprising carbon monoxide and hydrogen, and it is used, for example, as a clean medium-calorific-value fuel gas or as a feedstock for the synthesis of methanol, ammonia or hydrocarbons, which synthesis yields gaseous hydrocarbons and liquid hydrocarbons such as gasoline, middle distillates, lub oils and waxes.

In this specification and claims the terms "gaseous hydrocarbons" and "liquid hydrocarbons" will be used to refer to hydrocarbons that are at gasifier feed pressure and temperature gaseous and liquid, respectively.

A known method for producing synthesis gas is partially oxidizing a particulate solid fuel, such as coal, charcoal or petroleum coke, at a temperature in the range of from 1000° C. to 1800° C. and at a pressure in the range of from 0.1 MPa to 5 MPa in a reactor vessel with the use of an oxygen containing gas, wherein the particulate solid fuel is introduced into the reactor vessel in the form of a dispersion of particulate solid fuel in a gas such as an inert gas or syngas, or in the form of a dispersion of particulate solid fuel in a liquid such as residual oil or water.

In addition thereto, synthesis gas can be produced by partially oxidizing a liquid fuel, such as alcohol or a liquid hydrocarbon, in particular residual oil. The liquid fuel is partially oxidized at a temperature in the range of from 1000° C. to 1800° C. and at a pressure in the range of from 0.1 MPa to 8 MPa in a reactor vessel with the use of an oxygen containing gas, wherein the liquid fuel flowing into the reactor vessel is disintegrated with the use of oxygen containing gas.

Furthermore, synthesis gas can be produced by partially oxidizing in a reactor vessel a gaseous fuel such as gaseous hydrocarbons, in particular petroleum gas or natural gas, at a temperature in the range of from 1000° C. to 1800° C. and at a pressure in the range of from 0.1 MPa to 6 MPa with the use of an oxygen containing gas.

In this specification and in the claims the term "oxygen-containing gas" will refer to air, steam or oxygen, and the term "residual oil" will refer to a residual product that remains after application of a separation method such as, distillation or extraction on, for example, crude oil, tar sand, shale oil or coal extracts.

Synthesis gas will be produced near or at a crude oil refinery because the produced synthesis gas can directly be applied as a feedstock for the production of middle distillates, ammonia, methanol or as a fuel gas, for example, for heating the furnaces at the refinery or more efficiently for cogeneration of electricity and heat with load following electricity demand. Moreover, use can be made of the less valuable fuel products of the refinery.

If synthesis gas is produced by partially oxidizing a gaseous fuel, use can be made of refinery gas or of the gaseous hydrocarbons produced as a by-product of a synthesizing process. If synthesis gas is produced by partially oxidizing a liquid fuel, use can be made of residual oil and a limited amount of gas, for example a gaseous hydrocarbon, in order to disintegrate the flow of residual oil into the reactor vessel. If synthesis gas is produced by partially oxidizing a particulate solid fuel use can be made of particulate carbonaceous material dispersed in gas, in residual oil or water. However, in order to obtain a pumpable slurry only a limited amount of particulate carbonaceous material can be mixed with the liquid.

The above methods for producing synthesis gas, however, do not offer a large amount of operating flexibility because, in order to obtain a pumpable slurry, only a limited amount of particulate carbonaceous material can be dispersed in the liquid. Further the $H_2/CO$ ratio of the syngas can only be slightly varied without varying the amount of moderator gas.

Further, it is already known to produce synthesis gas by introducing into a reactor vessel separated from each other at leas two different fuels from the group which comprises particulate solid fuel, liquid fuel and gaseous fuel, and allowing the fuels to oxidize partially inside the reactor vessel with the use of an oxygen containing gas.

In particular, the invention relates to a simultaneous gasification process as described in the foregoing, wherein (heavy) residue feedstock and a hydrocarbon gas (e.g. methane) are suitable to be used as fuels and wherein the liquid (or solid) and/or gaseous hydrocarbons can be supplied in any ratio. In such a process less moderator and oxidizer is required to achieve a specific $H_2/CO$ ratio in the syngas.

In order to obtain an excellent gasification process it is necessary to ensure fine atomization of the liquid and good and rapid contacting or mixing of the fuels oxygen-containing gas and the moderator.

It is an object of the invention to provide a process for partial oxidation of a liquid or solid and/or a gaseous hydrocarbon-containing fuel wherein in situ fine atomization of the liquid is obtained or rapid dispersion of the solid. It is another object of the invention to provide a process for partial oxidation of a liquid or solid and/or a gaseous hydrocarbon-containing fuel wherein a good and rapid mixing or contacting of oxygen, fuels and moderator is obtained and pre-ignition or flame-flashback to the burner internals is prevented.

It is another object of the invention to provide a process for gasification wherein economic process conditions (for example reduction of supply moderator gas and oxygen and reduction of soot carbon production) are achieved with a sufficiently long burner-lifetime.

SUMMARY OF THE INVENTION

The invention therefore provides a process for partial oxidation of a liquid or solid and/or a gaseous hydrocarbon-containing fuel which process comprises supplying an oxygen-containing gas and hydrocarbon-containing fuel to a gasification zone through a concentric burner-arrangement of 4 concentric annular passages or channels and 1 central passage or channel, and producing auto-thermically a gaseous stream containing synthesis gas under appropriate conditions, and further comprises supplying the oxygen-containing gas through the first and third channels of the concentric arrangement at a relatively high velocity of 50-150 m/sec; supplying hydrocarbon-containing gas and/or moderator gas through the central channel and the fourth concentric channel encircling the central channel at a medium velocity of 5-84 m/sec; supplying liquid or solid hydrocarbon-containing fuel through the second concentric channel encircling the first channel at a relatively low velocity of 0-15 m/sec.

DESCRIPTION OF PREFERRED EMBODIMENTS

In an advantageous embodiment of the invention the respective velocities are measured at the outlet of the said respective channels into the gasification zone. The velocity measurement can be carried out in any way suitable for the purpose and will not be described in detail.

In another advantageous embodiment of the invention for only low amounts of hydrocarbon containing gas supply the hydrocarbon-containing gas and/or moderator gas supplied via the central channel or passage is replaced by oxidizer at a similar velocity.

In still another advantageous embodiment of the invention the moderator is steam or carbon dioxide. In still another advantageous embodiment of the invention the gasification process is carried out at a pressure of 0.1-12 MPa.

Multi-orifice burners comprising arrangements of annular concentric channels for supplying oxygen, fuel and moderator to gasification zones are known as such and will not be described in detail.

Usually such burners comprise hollow wall members with internal cooling fluid passages. However, the burner may for example be provided with a suitable ceramic or refractory lining applied onto or suspended by a means closely adjacent to the outer surface of the burner front wall for resisting the heat load during operation or heat-up/shut down situations of the burner.

According to the invention the oxygen and the fuel are supplied to the gasification zone through the respective channels at specific velocities in order to obtain a good atomization and mixing.

The invention will now be described in more detail by reference to the following example.

EXAMPLE

Tests have been carried out under the following conditions:

| burner specification | |
|---|---|
| diameter central channel | 52. mm |
| slot with first co-annular channel | 4.3 mm |
| slot with second co-annular channel | 3.0 mm |
| slot with third co-annular channel | 3.5 mm |
| slot with fourth co-annular channel | 5.7 mm |
| specification residual feedstock as fed to the burner | |
| C/H ratio | 1.41 mol/mol |
| density | 1000 kg/m$^3$ |
| viscosity | 0.1 kg/(m.s) |
| surface tension | 0.03 kg/s$^2$ |
| specification hydrocarbon containing gas as fed to the burner | |
| composition | 50% $CH_4$ |
| | 50% $C_2H_6$ |
| temperature | 250° C. |
| specification oxidizer as fed to the burner | |
| composition | 99% $O_2$ |
| | 1% $N_2$ + Ar |
| temperature | 250° C. |
| specification moderator as fed to the burner | |
| composition | 100% steam |
| temperature | 250° C. |

| Operating Conditions | CASE 1 | CASE 2 | CASE 3 |
|---|---|---|---|
| Reactor Pressure | 3.95 MPa | 3.95 MPa | 3.95 MPa |
| Mass Flow Residual Feedstock | 4.0 kg/s | 0 kg/s | 3.6 kg/s |
| hydrocarbon cont. gas | 0 kg/s | 3.8 | 0.6 kg/s |
| steam | 1.7 kg/s | 0 kg/s | 0.3 kg/s |
| oxidizer | 4.6 kg/s | 4.6 kg/s | 4.6 kg/s |
| Distribution of Feedstocks | | | |
| central channel | 60 m % steam | 60 m % hydrocarbon gas | 60 m % hydrocarbon gas + steam |
| first annular channel | 50 m % oxidizer | 50 m % oxidizer | 50 m % oxidizer |
| second annular channel | 100 m % residue | — | 100 m % residue |
| third annular channel | 50 m % oxidizer | 50 m % oxidizer | 50 m % oxidizer |
| fourth annular channel | 40 m % steam | 40 m % hydrocarbon gas | 40 m % hydrocarbon gas + steam |
| Velocity at Channel Outlet | | | |
| central channel | 28 m/s | 49 m/s | 17 m/s |
| first annular channel | 100 m/s | 100 m/s | 100 m/s |
| second annular channel | 6.5 m/s | 0 m/s | 5.8 m/s |
| third annular channel | 100 m/s | 100 m/s | 100 m/s |
| fourth annular channel | 28 m/s | 49 m/s | 17 m/s |
| reactor temperature | 1400° C. | 1400° C. | 1400° C. |
| Typical Yield Syngas | | | |
| $H_2$ + CO | 12.2 nm$^3$/s | 13.7 nm$^3$/s | 13.1 nm$^3$/s |
| $H_2$/CO | 1.0 $\frac{mol}{mol}$ | 1.6 $\frac{mol}{mol}$ | 1.0 $\frac{mol}{mol}$ |

-continued

| Operating Conditions | CASE 1 | CASE 2 | CASE 3 |
| --- | --- | --- | --- |
| $\dfrac{H_2O + CO_2}{H_2 + CO}$ | $0.17 \dfrac{mol}{mol}$ | $0.06 \dfrac{mol}{mol}$ | $0.02 \dfrac{mol}{mol}$ |

Various modifications of the present invention will become apparent to those skilled in the art from the foregoing description. Such modifications are intended to fall within the scope of the appended claims.

What is claimed is:

1. A process for partial oxidation of a liquid or solid and/or a gaseous hydrocarbon-containing fuel which process comprises
   supplying an oxygen-containing gas and hydrocarbon-containing fuel to a gasification zone through a concentric burner-arrangement of 4 concentric annular channels and one central channel, and producing auto-thermically a gaseous stream containing synthesis gas under appropriate conditions, and
   further comprises supplying the oxygen-containing gas through the first and third channels of the concentric arrangement at a relatively high velocity of 50–150 m/sec;
   supplying hydrocarbon-containing gas and/or moderator gas through the central channel and the fourth concentric channel encircling the central channel at a medium velocity of 5–84 m/sec; and
   supplying liquid or solid hydrocarbon-containing fuel through the second concentric channel encircling the first concentric channel at a relatively low velocity of 0–15 m/sec, provided that the respective velocities are measured at the outlet of the said respective concentric channels into the gasification zone.

2. The process of claim 1 wherein said moderator gas is selected from the group essentially consisting of steam or carbon dioxide.

3. The process of claim 1 wherein the pressure in said gasification zone is in the range of 0.1–12 MPa.

4. The process of claim 1 wherein 50±30 mass percent of the total mass flow of the oxygen-containing gas is supplied through the said first concentric channel, and the remaining mass flow is supplied to the said third concentric channel.

5. The process of claim 1 wherein 60±30 mass percent of the total mass flow of the hydrocarbon containing gas and/or moderator gas is supplied through the central channel, and the remaining mass flow of said hydrocarbon-containing gas and/or moderating gas is supplied to the said fourth concentric channel.

* * * * *